Feb. 20, 1962   A. R. GOELLNER   3,022,397
LIQUID LEVEL INDICATOR
Filed Dec. 11, 1959   2 Sheets-Sheet 1

INVENTOR.
ALLAN R. GOELLNER
BY Woodling and Krost,
ATTORNEYS

Feb. 20, 1962 A. R. GOELLNER 3,022,397
LIQUID LEVEL INDICATOR
Filed Dec. 11, 1959 2 Sheets-Sheet 2

INVENTOR.
ALLAN R. GOELLNER
BY *Woodling and Krost,*
ATTORNEYS

United States Patent Office 3,022,397
Patented Feb. 20, 1962

3,022,397
LIQUID LEVEL INDICATOR
Allan R. Goellner, Parma Heights, Ohio, assignor to
The Reliance Gauge Column Co.
Filed Dec. 11, 1959, Ser. No. 859,061
13 Claims. (Cl. 200—84)

The invention relates in general to a liquid level float operated switch and more particularly to a liquid level indicator which is effectively pivoted to move transversely so as to actuate a magnetically permeable member exterior to the float chamber which in turn actuates a switch.

The prior art has known various forms of liquid level float switches, including the type wherein the float moves generally vertically and directly vertically moves a permanent magnet inside a tube which in turn attracts an armature exterior to the tube to actuate a swich. This type of device has the decided disadvantage of establishing a quite definite amount of sliding friction of the magnet or armature within the tube and also the weight thereof places a definite limit on the minimum size of the float. Other forms of prior art devices have included floats which were effectively pivoted to pivotally move an armature or magnet, but the action thereof was limited both physically and magnetically so that the device was capable of only low pressure and low temperature operations and still was not positive in action.

Accordingly, an object of the present invention is to provide a simple, rugged and foolproof float switch.

Another object of the invention is to provide a float switch which is effectively pivoted in a manner which will not become difficult to pivotally move even under long adverse operating conditions.

Still another object of the invention is to provide a float switch with a permeable means which moves toward and away from two opposite sides of a tube and wherein non-magnetically permeable means exterior to the tube may be relatively attracted to these two opposite sides to actuate a switch.

Another object of the invention is to provide a float switch using a magnet and an armature relatively movable wherein both poles of the magnet are relatively movable toward the armature.

Still another object of the invention is to provide a float switch which will not become contaminated by any impurities in the liquid so as not to become inoperable even after many years of use.

Another object of the invention is to provide a float switch which is positive and direct in action and requires only a minimum of actuating force on the switch so as to permit use of a small and strong float of minimum buoyancy.

Still another object of the invention is to provide a float switch which will operate under high pressure and high temperature conditions wherein the float buoyancy is considerably lessened and yet the design of the invention permits the switch to remain at a relatively cool temperature.

Other objects and a fuller understanding of the invention may be had by referring to the following description and claims, taken in conjunction with the accompanying drawings, in which:

Figure 1:
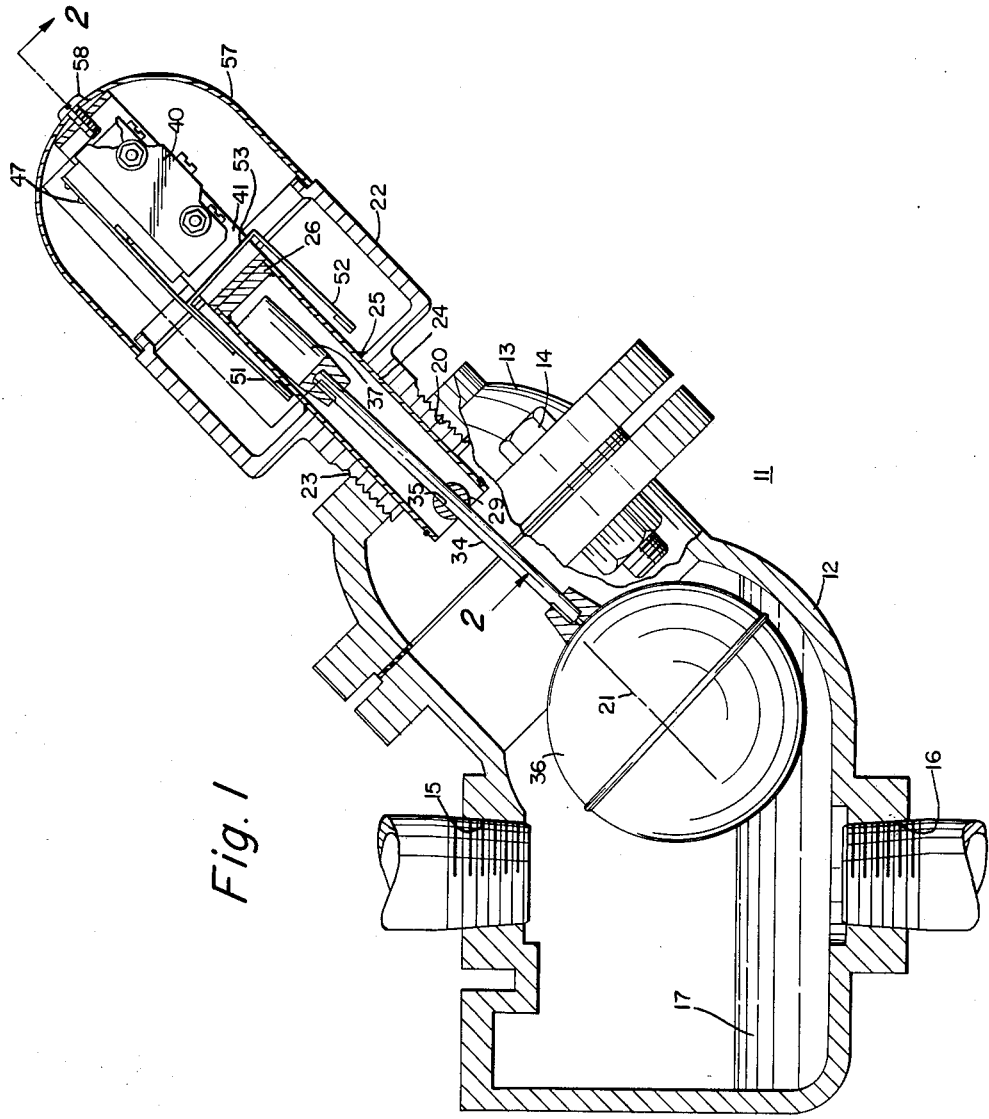
FIGURE 1 is a longitudinal sectional view of a liquid level indicator embodying the invention.

The figures show a liquid level indicator 11 including a body 12 and a cap 13 which may be made of any suitable material, such as cast iron. The cap may be fastened to the body 12 by bolts 14 for ready removal therefrom. The body 12 has threaded upper and lower connections 15 and 16 for connection to a reservoir or tank, not shown, such as a steam boiler to establish a liquid level 17 therein which may be variable.

The cap 13 has a threaded aperture 20 disposed on an axis 21 at an acute angle to the horizontal, in this case a 45° angle. A switch housing 22 has a reduced diameter shank 23 threaded into the aperture 20. The shank 23 and switch housing 22 are hollow and mounted therein is a tube 24 brazed to the housing at 25. The lower end of the tube 24 is open and the upper end of the tube is closed in any suitable manner, such as with a non-magnetic plug 26 fastened therein. This plug 26 may be brass, for example, and brazed to the tube 24. This encloses and hermetically seals the entire float chamber consisting of the body 12, cap 13, housing 22 and tube 24.

The lower end of the tube 24 has diametrically opposed slots 27 and 28 extending upwardly from the lower or inner end thereof. A horizontally disposed pivot shaft 29 has reduced diameter ends which pivotally engage the slots 27 and 28 and extend laterally beyond the diameter of the tube 24. A snap ring 30 engages a groove 31 in the outer wall of the tube to retain the pivot shaft 30 in the lower end of the tube 24. A float rod 34 passes through an aperture 35 in the pivot shaft 29 and is brazed thereto. A float 36 is fastened to the lower end of the float rod 34 and a first permeable means 37, shown as a permanent magnet, is attached to the upper end of the float rod 34. The tube 24 is preferably made non-magnetic, such as from non-magnetic stainless steel in order to provide two opposite sides of the tube or surfaces which are non-magnetic. Therefore, the entire float 36, float rod 34 and permanent magnet 37 pivot at a point between the magnet 37 and float 36 and the weight of the magnet 37 is such as to nearly counterbalance the weight of the float 36.

The switch housing 22 mounts a miniature and low force switch 40 on a sheet metal bracket 41 attached in any suitable manner relative to the tube 24 or switch housing 22. It is shown as being brazed to the end of the tube 24. A heat insulating shield 42, such as fiber or asbestos, is positioned between the bracket 41 and switch 40 with the switch 40 mounted to the bracket by bolts 43 passing through enlarged holes 44 for limited adjustment movement. The switch 40 may be of the type having a leaf spring type of actuator arm 45 acting on an actuator button 46 and mounted on the switch at 47 so as to be effectively pivoted to the switch near the point of mounting. The switch has first and second electrical conditions, such as an on and off condition, or in this particular case, the switch is shown as a single pole double-throw switch having three terminals 48 so that the user may select normally open or normally closed functions.

First and second magnetically permeable legs 51 and 52 form a part of a U-shaped armature 53 which is attached to and actuates the switch arm 45. This U-shaped armature encompasses the upper or outer closed end of the tube 24 and the legs 51 and 52 extend longitudinally adjacent opposite sides of this tube 24. Also these first and second legs 51 and 52 are generally longitudinally coextensive with the permanent magnet 37 which has longitudinally disposed north and south poles. The legs 51 and 52 may be provided with non-magnetic spacers 54 at the ends thereof to maintain a pre-determined minimum distance at all times between the magnet and the armature.

An enclosing cover 57 for the switch 40 engages the switch housing 22 and is held in place by a screw 58 engaging the end of the bracket 41. The design of the switch housing 22 and of the entire indicator 11 is such that the cover 57 may be made of heavier wall thickness so as to readily transform the entire indicator into one suitable for an explosion-proof design.

The legs 51 and 52 of the armature are relatively closely spaced to the opposite sides of the tube 24 and are spaced more closely to these sides than the distance of transverse movement of the magnet 37. FIGURE 1, for example, shows the indicator with a low liquid level 17 whereat the float 36 is not floatationally supported. In this condition the magnet 37 abuts the upper side of the tube 24 and relatively attracts the leg 51 into engagement with the upper side of the tube. When the liquid level 17 rises, the float rod 34 pivots and the magnet moves away from the upper side of the tube 24 toward engagement with the lower side. Shortly after the magnet 37 passes the center line, the distance of the magnet 37 to the second leg 52 will become less than the distance to the first leg 51 and, accordingly, the magnetic attraction to the leg 52 will become greater and, accordingly, the armature 53 will rapidly move to the upper position or second condition shown in FIGURE 3. This changes the switch 40 to the second condition. Should the liquid level fall the opposite effect will take place, the magnet will move upward beyond the center line and the armature will snap downwardly again to the first condition.

Figure 2:
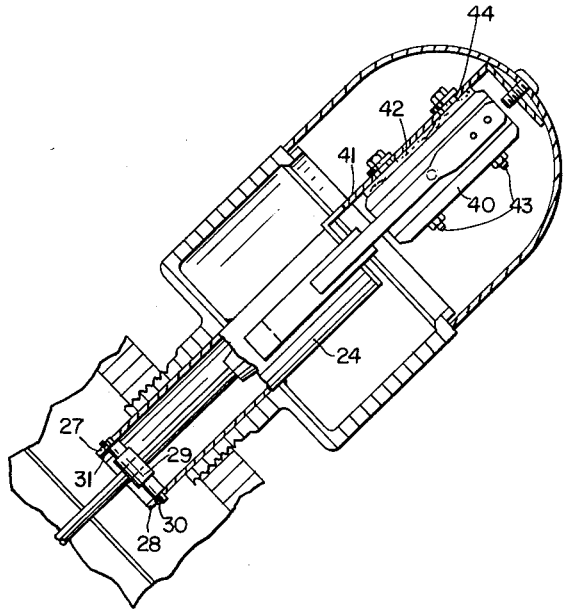
FIGURE 2 is a sectional view on line 2—2 of FIGURE 1.
Figure 3:
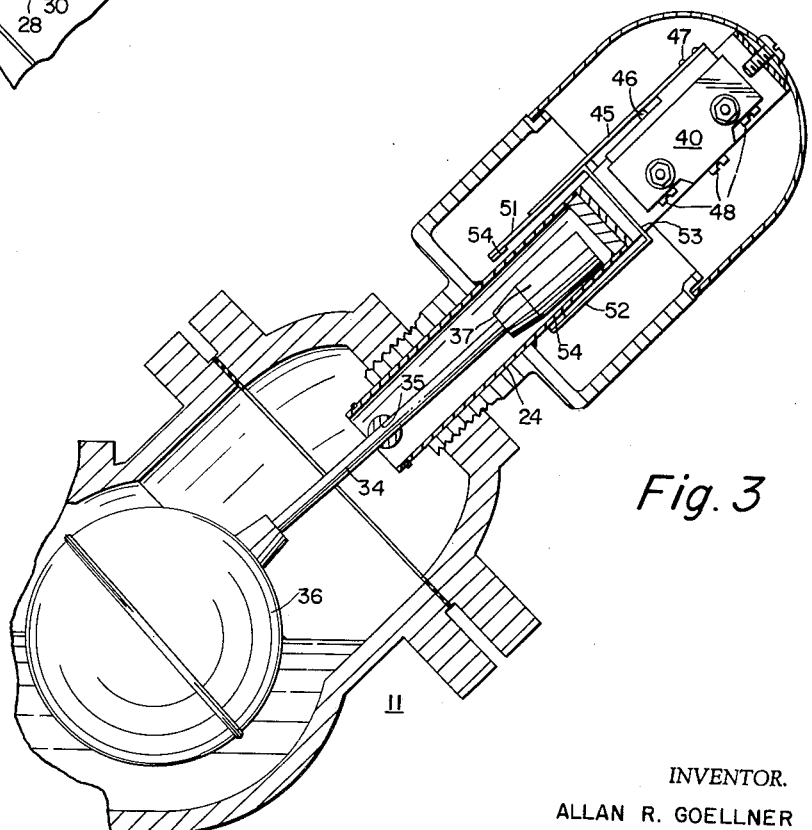
FIGURE 3 is a longitudinal sectional view similar to FIGURE 1, but showing the device in an actuated condition.

The spacers 54 reduce the release force of the magnet 37 relative to the armature legs 51 and 52 without increasing the pull-in force materially. It has been found that action of the float switch with and without the spacers 54 shows the advantage of using these spacers. The pull-in force; namely, the force at which the armature attracts leg 52, for example, in the change from FIGURE 1 to FIGURE 3, is not increased materially, yet the armature leg 51 is released much more readily and with a lower force from the magnet 37. This means that the difference in liquid level 17 between pull-in and drop-out points is materially reduced. This difference in release and pull-in points is caused by the inverse square relationship of the magnetic attraction with respect to spacing between the armature and magnet. This means that the entire float switch is more sensitive.

The switch 40 is of the miniature type which has a built-in snap action or over center device, and many such switches are on the market which require only a small movement of the actuating arm 45, yet only a small actuating force in the order of a few ounces. The design of the indicator is such that the armature 53 may be made of one piece of magnetically permeable sheet metal, yet be very light. The lightness of the armature 53 plus the fact of mounting the float rod 34 along a 45° axis permits the inherent resiliency in the switch arm 45 and the internal structure of the switch 40 to generally counterbalance the small weight of the armature 53. Because of the small weight and mass of the armature the switch action is very quick and positive. Also because of the small weight and mass of the armature 53 the magnet 37 may be quite small and still establish its magnetic influence through the walls of the non-magnetic tube 24. Also since the magnet acts on opposite sides of the tube 24, there is a definite snap-over or snap action movement to the armature 53 when the magnetic over center point is reached in movement of the magnet 37.

The small light permanent magnet 37, being mounted on a pivoted float rod 34 means that the float 36 may be small in diameter since the effective weight which the float must move is small. Also the weight of the magnet tends to counterbalance the weight of the float 36. This means that the float 36 may be made of relatively heavy walled material to withstand high temperature and high operaing pressures. Also such operating pressures are easily withstood by the shape and design of the entire float chamber including the tube 24. The upper end of the tube 24 as closed by the brass plug 26 may be thick to withstand such operating pressures, yet the thickness at this point has no deleterious effect on the operation of the magnet 37 and armature 53.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A liquid level indicator, comprising, in combination, a float chamber for a liquid and having a tubular portion with an axis, a float effectively pivoted in said chamber, first magnetically permeable means extending longitudinally in said tubular portion and pivotally actuated by said float toward first and second sides of said tubular portion, the weight of said permeable means almost counterbalancing the weight of said float in air, said first and second sides of said tubular portion being non-magnetic, electrical switch means mounted near the tubular portion and having first and second conditions, a transversely movable actuator arm for said switch means and extending generally parallel to said axis, second magnetically permeable means acting on said arm and including first and second permeable legs longitudinally extending along the first and second sides of said tube, one of said first and second permeable means being magnetized, and said legs extending longitudinally adjacent said first permeable means, whereby movement of said first permeable means actuates said switch means between said first and second conditions.

2. A liquid level float switch, comprising, in combination, a float chamber for a liquid and having a tube with an axis, a float rod extending longitudinally in said tube, means to effectively pivotally mount said float and rod in said tube, a float on the inner end of said float rod on one side of said effective pivot, first magnetically permeable means on the outer end of said float rod on the other side of said effective pivot and movable by said float into abutment with the upper and lower sides of said tube, said permeable means almost counterbalancing the weight of said float in air, said upper and lower sides of said tube being non-magnetic, electrical switch means mounted near said tube and having first and second conditions, a transversely movable actuator arm for said switch means and extending generally parallel to said axis, second magnetically permeable means acting on said arm and including first and second permeable legs longitudinally extending along the upper and lower sides of said tube, one of said first and second permeable means being magnetized, and said legs extending longitudinally adjacent said first permeable means, whereby movement of said first permeable means actuates said switch means between said first and second conditions.

3. A liquid level float switch, comprising, in combination, a float chamber for a liquid and having a tube with an axis at an acute angle to the horizontal, pivot means, a float rod on said pivot means and extending longitudinally in said tube, a float on the lower end of said float rod, first magnetically permeable means on the upper end of said float rod and movable by said float into abutment with the upper and lower sides of said tube, said upper and lower sides of said tube being non-magnetic, electrical switch means mounted near said tube and having first and second conditions, a transversely movable actuator arm for said switch means and extending generally parallel to said axis, second magnetically permeable means acting on said arm and including first and second permeable legs longitudinally extending along the upper and lower sides of said tube, one of said first and second permeable means being magnetized, and said legs extending longitudinally adjacent said first permeable means, whereby movement of said first permeable means actuates said switch means between said first and second conditions.

4. A liquid level float switch, comprising, in combination, a float chamber for a liquid, a tube as part of said float chamber with an axis at an acute angle to the horizontal, a float rod pivoted on substantially horizontal pivot means and extending longitudinally in said tube, a float on the lower end of said float rod, a permanent magnet on the upper end of said float rod and with longitudinally spaced poles and movable by said float into abutment with the upper and lower sides of said tube, an electrical switch mounted near the upper end of said tube and having first and second conditions, a transversely movable actuator arm for said switch and extending generally parallel to said axis, armature means carried by said arm and including first and second permeable legs longitudinally extending along the upper and lower sides of said tube, the said upper and lower sides of said tube being non-magnetic, and said armature legs extending longitudinally adjacent said permanent magnet, whereby movement of said magnet actuates said switch between said first and second conditions.

5. A liquid level float switch, comprising, in combination, a float chamber for a liquid, a surface in said float chamber defining an opening with an axis, a non-magnetic tube coaxially fixed in said opening, a float rod pivoted near the inner end of said tube and extending longitudinally in said tube, a float fixed on the inner end of said float rod, first magnetically permeable means substantially coaxially fixed on the outer end of said float rod, an electrical switch mounted near the outer end of said tube and having first and second conditions, a transversely movable actuator arm for said switch connected thereto and extending generally parallel to said axis, second magnetically permeable means acting on said arm and including first and second permeable legs longitudinally extending along the upper and lower sides of said tube, said legs extending longitudinally adjacent said first permeable means, and one of said first and second permeable means being permanently magnetized, whereby with said float in said float chamber not being supported by liquid the said first permeable means abuts the upper side of said tube to relatively attract said first leg into engagement with said upper side of said tube to establish said switch in said first condition, and whereby with said float being flotationally supported by liquid the said first permeable means is moved into engagement with the lower side of said tube and said second leg rapidly moves into engagement with said lower side of said tube to establish said switch in said second condition.

6. A liquid level float switch, comprising, in combination, a float chamber for a liquid, a surface in said float chamber defining an opening with an axis, a non-magnetic tube coaxially fixed in said opening, the outer end of said tube being closed to hermetically seal said float chamber, diametrically opposed bearings in the inner end of said tube, a substantially horizontal pivot shaft having two ends journalled in said bearings, a float rod carried in said pivot shaft and extending longitudinally in said tube, a float fixed on the inner end of said float rod, first magnetically permeable means substantially coaxially fixed on the outer end of said float rod, an electrical switch mounted near the outer end of said tube and having first and second conditions, a transversely movable actuator arm for said switch connected thereto and extending generally parallel to said axis, second magnetically permeable means acting on said arm and having first and second permeable legs longitudinally extending along the upper and lower sides of said tube, said legs extending longitudinally adjacent said first permeable means, and one of said first and second permeable means being permanently magnetized with longitudinally spaced poles, whereby with said float in said float chamber not being supported by liquid the said first permeable means abuts the upper side of said tube to relatively attract said first leg into engagement with said upper side of said tube to establish said switch in said first condition, and whereby with said float being flotationally supported by liquid the said first permeable means is moved into engagement with the lower sider of said tube and said second leg rapidly moves into engagement with said lower side of said tube to establish said switch in said second condition.

7. A liquid level float switch, comprising, in combination, a float chamber for a liquid, a surface in said float chamber defining an opening with an axis, a non-magnetic tube coaxially fixed in said opening, the outer end of said tube being closed to hermetically seal said float chamber, diametrically opposed bearings in the inner end of said tube, a substantially horizontal pivot shaft having two ends journalled in said bearings, a float rod carried in said pivot shaft and extending longitudinally in said tube, a float fixed on the inner end of said float rod, a permanent magnet with longitudinally spaced poles coaxially fixed on the outer end of said float rod, an electrical switch mounted relative to the outer end of said tube and having first and second conditions, a transversely movable actuator arm for said switch connected thereto and extending generally parallel to said axis, an armature acting on said arm and having first and second permeable legs longitudinally extending along the upper and lower sides of said tube, and said armature legs extending longitudinally adjacent said permanent magnet, whereby with said float in said float chamber not being supported by liquid the said magnet abuts the upper side of said tube to attract said first leg of said armature into engagement with said upper side of said tube to establish said switch in said first condition, and whereby with said float being flotationally supported by liquid the said magnet is moved into engagement with the lower side of said tube and said second leg of said armature rapidly moves into engagement with said lower side of said tube to establish said switch in said second condition.

8. A liquid level float switch, comprising, in combination, a float chamber for a liquid, a non-magnetic tube in said float chamber with an axis at an acute angle to the horizontal, a float rod pivoted on substantially horizontal pivot means and extending longitudinally in said tube, a float on the lower end of said float rod, a permanent magnet on the upper end of said float rod and with longitudinally spaced poles, a bracket fixed relative to said tube and extending beyond the upper end of said tube, an electrical switch mounted on said bracket and having first and second conditions, a transversely movable actuator arm for said switch connected thereto and extending generally parallel to said axis, armature means carried by said arm and including first and second permeable legs longitudinally extending along the upper and lower sides of said tube, and said armature legs extending longitudinally adjacent said permanent magnet, whereby with said float in said float chamber not being supported by liquid the said magnet abuts the upper side of said tube to attract said first leg into engagement with said upper side of said tube to establish said switch in said first condition, and whereby with said float being flotationally supported by liquid the said magnet is moved into engagement with the lower side of said tube and said second leg rapidly moves into engagement with said lower side of said tube to establish said switch in said second condition.

9. A liquid level float switch, comprising, in combination, a float chamber for a liquid, a non-magnetic tube in said float chamber with an axis at an acute angle to the horizontal, the upper end of said tube being closed to hermetically seal said float chamber, a substantially horizontal pivot shaft having two ends journalled in the lower end of said tube, a float rod carried in said pivot shaft and extending longitudinally in said tube, a float fixed on the lower end of said float rod, a generally cylindrical permanent magnet coaxially fixed on the upper end of said float rod, the weight of said permanent magnet almost counterbalancing the weight of said float in air to enable said float to readily move said magnet under flotation conditions of said float in the liquid to be measured, a bracket fixed relative to said tube and extending beyond the upper end of said tube, an electrical switch mounted on said bracket and having first and second conditions, a transversely movable actuator arm for said switch connected thereto and extending generally parallel to said axis, armature means carried by said arm and including first and second permeable legs longitudinally extending along the upper and lower sides of said tube, said armature legs extending longitudinally adjacent said permanent magnet, and the distance between said second leg and the lower side of said tube when said first leg engages the upper side of said tube being less than the amount of transverse pivotal movement of said magnet under influence of said float, whereby with said float in said float chamber not being supported by liquid the said magnet abuts the upper side of said tube to attract said first armature leg into engagement with said upper side of said tube to establish said switch in said first condition, and whereby with said float being flotationally supported by liquid the said magnet is moved into engagement with the lower side of said tube and said second armature leg rapidly moves into engagement with said lower side of said tube to establish said switch in said second condition.

10. A liquid level float switch, comprising, in combination, a float chamber for a liquid, a surface in said float chamber defining an opening with an axis at an acute angle to the horizontal, a non-magnetic tube coaxially fixed in said opening, the upper end of said tube being closed to hermetically seal said float chamber, diametrically opposed bearings in the lower end of said tube, a substantially horizontal pivot shaft having two ends journalled in said bearings, a float rod carried in said pivot shaft and extending longitudinally in said tube, a float fixed on the lower end of said float rod, a generally cylindrical permanent magnet coaxially fixed on the upper end of said float rod, the weight of said permanent magnet almost counterbalancing the weight of said float in air to enable said float to readily move said magnet under flotation conditions of said float in the liquid to be measured, a bracket fixed relative to said tube and extending beyond the upper end of said tube, an electrical switch mounted on said bracket and having first and second conditions, a transversely movable actuator arm for said switch connected thereto and extending generally parallel to said axis, an armature carried by said arm having first and second permeable legs longitudinally extending along the upper and lower sides of said tube, said armature legs extending longitudinally adjacent said permanent magnet, and the distance between said second leg and the lower side of said tube when said first leg engages the upper side of said tube being less than the amount of transverse pivotal movement of said magnet under influence of said float, whereby with said float in said float chamber not being supported by liquid the said magnet abuts the upper side of said tube to attract said first leg of said armature into engagement with said upper side of said tube to establish said switch in said first condition, and whereby with said float being flotationally supported by liquid the said magnet is moved into engagement with the lower side of said tube and said second leg of said armature rapidly moves into engagement with said lower side of said tube to establish said switch in said second condition.

11. A liquid level float switch, comprising, in combination, a float chamber for a liquid, a surface in said float chamber defining an opening with an axis at an angle of substantially 45° to the horizontal, a non-magnetic tube coaxially fixed in said opening, an enclosing plug in the upper end of said tube to hermetically seal the upper end thereof and to hermetically seal said float chamber, diametrically opposed slots in the lower end of said tube, a substantially horizontal pivot shaft having two ends journalled in said slots and with the two ends thereof extending beyond said tube, a snap ring encircling said tube and lying in a groove in the outer surface thereof to retain said pivot shaft within said slots, a float rod carried in said pivot shaft and extending longitudinally in said tube, a float fixed on the lower end of said float rod, a generally cylindrical permanent magnet coaxially fixed on the upper end of said float rod, the weight of said permanent magnet almost counterbalancing the weight of said float in air to enable said float to readily move said magnet under flotation conditions of said float in the liquid to be measured, a bracket fixed relative to said tube and extending substantially parallel to said axis beyond the upper end of said tube, an electrical switch mounted on said bracket and having first and second conditions, an actuator arm for said switch connected thereto and extending generally parallel to said axis, a permeable sheet metal armature carried by said arm and having first and second legs longitudinally extending along the upper and lower sides of said tube, said armature legs extending longitudinally adjacent said permanent magnet, and the distance between said second leg and the lower side of said tube when said first leg engages the upper side of said tube being less than the amount of transverse pivotal movement of said magnet under influence of said float, whereby with said float in said float chamber not being supported by liquid the said magnet abuts the upper side of said tube to attract said first leg of said armature into engagement with said upper side of said tube to establish said switch in said first condition, and whereby with said float being flotationally supported by liquid the said magnet is moved into engagement with the lower side of said tube and said second leg of said armature rapidly moves into engagement with said lower side of said tube to establish said switch in said second condition.

12. A liquid level float switch, comprising, in combination, a float chamber, connection means in said float chamber for connection to a tank having a liquid level to be determined, a surface in said float chamber defining an opening with an axis at an angle of substantially 45° to the horizontal, a cap coaxially attached to said float chamber at said opening, a coaxial threaded aperture in said cap, a housing threaded in said coaxial aperture, a non-magnetic stainless steel tube coaxially mounted and brazed in said housing with the lower end thereof extending into said cap, an enclosing plug brazed in the upper end of said tube to hermetically seal the upper end thereof and to hermetically seal said float chamber, cap and housing, diametrically opposed slots in the lower end of said tube, a horizontal pivot shaft having two ends journalled in said slots and with the two ends thereof extending beyond said tube, a snap ring encircling said tube and lying in a groove in the outer surface thereof to retain said pivot shaft within said slots, a float rod fixed in said pivot shaft and extending longitudinally in said tube, a float fixed on the lower end of said float rod, a generally cylindrical permanent magnet coaxially fixed on the upper end of said float rod, the weight of said permanent magnet almost counter-balancing the weight of said float in air to enable said float to readily move said magnet under flotation conditions of said float in the liquid to be measured, a sheet metal bracket fixed to the upper end of said tube and extending substantially parallel to said axis beyond the upper end of said tube, an electrical switch mounted on said bracket and having first and second electrical conditions, an actuator arm for said switch connected thereto and extending generally parallel to said axis, a permeable U-shape sheet metal armature carried by said arm and having first and second legs encompassing the end and the upper and lower diametrically opposite sides, respectively, of said tube, said armature legs extending longitudinally with respect to said tube and being substantially longitudinally coextensive with said permanent magnet, and the distance between said second leg and the lower side of said tube when said first leg engages the upper side of said tube being less than the amount of transverse pivotal movement of said magnet under influence of said float, whereby with said float in said float chamber not being supported by liquid the said magnet abuts the upper side of said tube to attract said first leg of said armature into engagement with said upper side of said tube to establish said switch in said first condition, and whereby with said float being flotationally supported by liquid the said magnet is moved into engagement with the lower side of said tube and said second leg of said armature rapidly moves into engagement with said lower side of said tube to establish said switch in said second condition.

13. A liquid level float switch comprising, in combination, a float chamber for a liquid, a tube in said float chamber with an axis at an acute angle to the horizontal, a float rod pivoted in the lower end of said tube and extending longitudinally in said tube, a float fixed on the lower end of said float rod, a permanent magnet coaxially fixed on the upper end of said float rod, the weight of said permanent magnet almost counterbalancing the weight of said float in air to enable said float to readily move said magnet under flotation conditions of said float in the liquid to be measured, an electrical switch mounted relative to said tube and having first and second conditions, armature means connected to actuate said switch and including first and second permeable legs longitudinally extending along the upper and lower sides of said tube, said armature legs extending longitudinally adjacent said permanent magnet and the distance between said second leg and the lower side of said tube when said first leg engages the upper side of said tube being less than the amount of transverse pivotal movement of said magnet under influence of said float, whereby with said float in said float chamber not being supported by liquid the said magnet abuts the upper side of said tube to attract said first armature leg into engagement with said upper side of said tube to establish said switch in said first condition, and whereby with said float being flotationally supported by liquid the said magnet is moved into engagement with the lower side of said tube and said second armature leg rapidly moves into engagement with said lower side of said tube to establish said switch in said second condition.

References Cited in the file of this patent
UNITED STATES PATENTS

| | | |
|---|---|---|
| 2,576,561 | Binford | Nov. 27, 1951 |
| 2,666,823 | Wilson | Jan. 19, 1954 |

FOREIGN PATENTS

| | | |
|---|---|---|
| 1,112,302 | France | Mar. 13, 1956 |